(12) United States Patent
Cusumano et al.

(10) Patent No.: US 9,947,945 B2
(45) Date of Patent: Apr. 17, 2018

(54) VENTILATION SYSTEM FOR AN AUTOMOTIVE FUEL CELL STACK ENCLOSURE

(75) Inventors: Thomas Joseph Cusumano, Royal Oak, MI (US); Deborah Diane Pittman, Belleville, MI (US); Donald Paul Alessi, Jr., Vancouver (CA)

(73) Assignee: Ford Global Technologies, LLC, Dearborn, MI (US)

( * ) Notice: Subject to any disclaimer, the term of this patent is extended or adjusted under 35 U.S.C. 154(b) by 2457 days.

(21) Appl. No.: 12/019,724

(22) Filed: Jan. 25, 2008

(65) Prior Publication Data

US 2009/0191805 A1    Jul. 30, 2009

(51) Int. Cl.
  *B60H 1/24* (2006.01)
  *H01M 8/04* (2016.01)
  *H01M 8/2475* (2016.01)

(52) U.S. Cl.
  CPC ........... *H01M 8/04* (2013.01); *H01M 8/2475* (2013.01); *H01M 2250/20* (2013.01); *Y02T 90/32* (2013.01)

(58) Field of Classification Search
  CPC .. H01M 8/04; H01M 8/2475; H01M 2250/20; Y02T 90/32
  USPC .......... 454/69, 238, 146, 142, 143, 144, 237
  See application file for complete search history.

(56) References Cited

U.S. PATENT DOCUMENTS

| | | | |
|---|---|---|---|
| 5,979,540 A * | 11/1999 | Allison et al. | 165/41 |
| 6,242,121 B1 | 6/2001 | Pedicini et al. | |
| 6,290,594 B1 | 9/2001 | Osborne | |
| 6,395,414 B1 | 5/2002 | Clingerman et al. | |
| 6,514,136 B1 * | 2/2003 | Hanaya et al. | 454/147 |
| 6,544,116 B1 * | 4/2003 | Cerbo | 454/162 |
| 6,782,914 B2 | 8/2004 | Kami et al. | |
| 6,978,855 B2 * | 12/2005 | Kubota et al. | 429/442 |
| 7,108,091 B2 * | 9/2006 | Guidry et al. | 180/68.1 |
| 7,138,198 B2 | 11/2006 | Kondo | |
| 7,686,111 B2 * | 3/2010 | Koenekamp et al. | 180/65.1 |
| 2006/0141299 A1 | 6/2006 | Piccirillo | |
| 2007/0178346 A1 * | 8/2007 | Kiya et al. | 429/24 |

FOREIGN PATENT DOCUMENTS

| | | | |
|---|---|---|---|
| JP | 2004161057 | | 6/2004 |
| JP | 2004161058 A | * | 6/2004 |
| JP | 2004331024 A | * | 11/2004 |
| JP | 2005085476 | | 3/2005 |
| JP | 2005306210 A | * | 11/2005 |
| JP | 2006114377 | | 4/2006 |
| JP | 2007299593 A | * | 11/2007 |

OTHER PUBLICATIONS

JP2005306210A Translation.*
American Heritage Dictionary, online, entries: duct and conduit.*

* cited by examiner

*Primary Examiner* — Gregory Huson
*Assistant Examiner* — Dana Tighe
(74) *Attorney, Agent, or Firm* — James Dottavio; Brooks Kushman P.C.

(57) ABSTRACT

A fuel cell stack is housed within a fuel cell stack enclosure. Air is used to ventilate the fuel cell stack enclosure. The air may be pulled from an air stream used to cool a high voltage battery. The air may also be pulled from a vehicle compartment such as a vehicle trunk or vehicle cabin. Filters are used to remove particulate matter from the air.

7 Claims, 3 Drawing Sheets

VENTILATION SYSTEM FOR AN AUTOMOTIVE FUEL CELL STACK ENCLOSURE

BACKGROUND

1. Field of the Invention

The invention relates to ventilation systems for automotive fuel cell stack enclosures.

2. Discussion

A fuel cell is an electrochemical energy conversion device. Fuel cells produce electrical energy via the electrochemical combination of a fuel and an oxidant. The fuel and oxidant react in the presence of an electrolyte. In some fuel cells, the reactants flow into the fuel cell and the reaction products flow out of the fuel cell. The electrolyte, however, remains in the fuel cell. Fuel cells may continue to produce electrical energy as long as the necessary flow of fuel and oxidant are maintained.

During hydrogen fuel cell operation, hydrogen is channeled to an anode catalyst where it dissociates into protons and electrons. The protons are transported through an insulating membrane to a cathode catalyst. The electrons are conducted through an external circuit. Oxygen reacts with the protons and electrons to form water on the cathode catalyst.

A hydrogen fuel cell system for an automotive vehicle includes a fuel cell stack housed within a fuel cell enclosure. A fuel cell stack includes a plurality of individual fuel cells. The fuel cell stack converts hydrogen and oxygen into electricity and water via an electrochemical process. An air compressor delivers oxygen to the fuel cell stack at a required pressure for the electrochemical reaction. During the reaction, small quantities of hydrogen escape past seals on the individual cells of the fuel cell stack. This hydrogen is captured within the fuel cell enclosure.

SUMMARY

Air is delivered to a fuel cell stack enclosure of a vehicle. In some examples, the vehicle includes an electrical power storage unit. In such examples, a duct fluidly connects an air source and the electrical power storage unit. The duct delivers air to the electrical power storage unit to cool the electrical power storage unit. An air passage line fluidly connects the duct and the fuel cell stack enclosure. The air passage line delivers air to the fuel cell stack enclosure to remove hydrogen from the fuel cell stack enclosure.

In other examples, an air passage line fluidly connects the fuel cell stack enclosure and a vehicle compartment. The vehicle compartment may be a cabin. The vehicle compartment may also be a trunk. The air passage line delivers air to the fuel cell stack enclosure to remove hydrogen from the fuel cell stack enclosure.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

The manner in which a fuel cell stack enclosure is sealed to prevent water and dust intrusion also prevents the natural dispersion of small amounts of hydrogen which escape from edges of fuel cells of a fuel cell stack within the fuel cell stack enclosure. As a result, the fuel cell stack enclosure may be ventilated to eliminate this hydrogen build-up.

Extracting stack ventilation air from a main intake air cleaner poses several issues. As an example, extracting air prior to a mass air-flow sensor (MAFS) used to monitor the amount of reactant oxygen for the fuel cell stack creates non-laminar flow across the MAFS. This non-laminar flow results in inaccuracies in air flow measurement. As another example, extracting air after the MAFS requires development of new compressor calibration tables to compensate for the subtraction of stack ventilation air from a main fuel cell system air intake stream. As yet another example, the stack ventilation air should be cleaned to avoid introducing particulate matter that may contaminate the fuel cell stack enclosure.

Some systems disclosed herein extract air to ventilate the fuel cell stack enclosure from a battery air handling system (BAHS). The BAHS cools high voltage batteries, or other electrical power storage units, used in fuel cell electric vehicles. In some examples, a tee-type fluid connector is introduced downstream of the BAHS filtration screens. The filtration screens prevent large particles from entering the BAHS air stream. A stack ventilation blower extracts air from the BAHS air stream via the tee-type fluid connector. The extracted air is passed through a fine filtration system, e.g., a pleated paper filter, before being introduced into the fuel cell stack enclosure. The extracted air dilutes and removes hydrogen from within the fuel cell stack enclosure.

Other systems disclosed herein extract air to ventilate the fuel cell stack enclosure from a compartment, such as a trunk or cabin, of a vehicle. In some examples, a stack ventilation blower extracts air from the trunk. The extracted air is passed through a discrete filtration system before being introduced into the fuel cell stack enclosure. Again, the extracted air dilutes and removes hydrogen from within the fuel cell stack enclosure.

Figure 1:
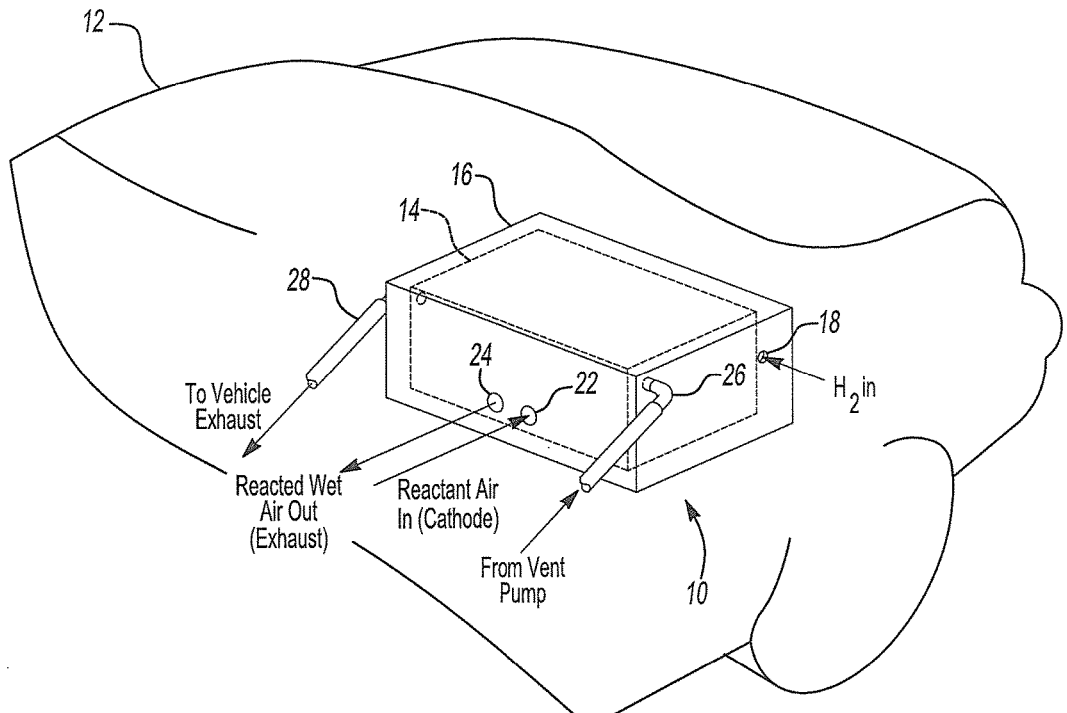
FIG. 1 is a schematic diagram of a portion of an exemplary hydrogen fuel cell system for an automotive vehicle.

An exemplary hydrogen fuel cell stack system 10 for a vehicle 12 of FIG. 1 includes a fuel cell stack 14 and a fuel cell stack enclosure 16. The fuel cell stack 14 includes a number of membranes (not shown). The fuel cell stack 14 receives hydrogen fuel via a hydrogen inlet port 18. This hydrogen fuel is channeled to anode sides of catalysts (not shown) where it dissociates into protons and electrons. The protons are transported through the membranes to cathode catalysts (not shown). The electrons are conducted through an external circuit (not shown) to produce electrical energy. The fuel cell stack 14 receives reactant air via a reactant air inlet port 22. Oxygen from the reactant air reacts with the protons and electrons to form water on cathode sides of the catalysts. The fuel cell stack 14 expels reacted wet air via a reacted wet air outlet port 24. Pumps and/or tank pressure (not shown) provide the hydrogen fuel and reactant air respectively to the fuel cell stack 14.

During operation, hydrogen diffuses out from edges of the fuel cell stack 14 and the connections between the hydrogen inlet port 18 and fuel cell stack 14. The fuel cell stack enclosure 16 is sealed to prevent the intrusion of water and dust into the fuel cell stack enclosure 16. This sealing, however, prevents the natural dispersion of small amounts of hydrogen from the fuel cell stack enclosure 16.

The fuel cell stack enclosure 16 receives ventilating air via a ventilation inlet port 26 and expels the ventilating air via a ventilation outlet port 28. The ventilating air reduces and/or eliminates hydrogen from the fuel cell stack enclosure 16.

Figure 2:
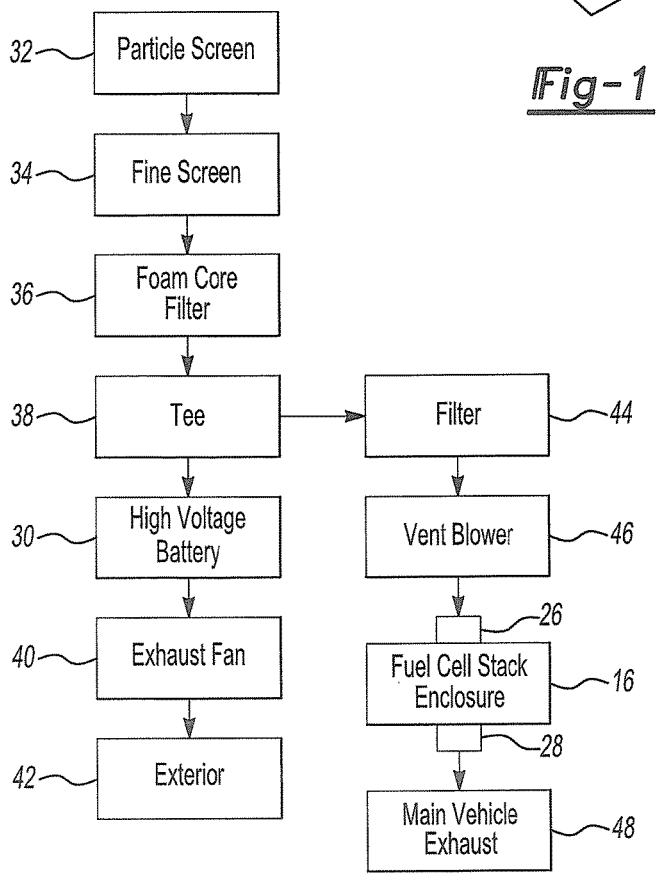
FIG. 2 is a block diagram of an exemplary ventilation system for the hydrogen fuel cell system of FIG. 1 according to certain embodiments of the invention.

As may be seen in the example of FIG. 2, ventilating air used to ventilate the fuel cell stack enclosure 16 is extracted from an air stream used to cool a high voltage battery 30. In the example of FIG. 2, the path of air is indicated by arrows. Air enters a rough particulate screen 32 to filter out large particulate matter. The air next enters a fine particulate screen 34 to filter out fine particulate matter. The air then enters a foam core filter 36 to filter out even finer particulate matter. In other examples, a fewer or greater number of filters may be used. At this point, the air encounters a tee connection 38. Some of the air will be used to cool the high voltage battery 30. Other of the air will be used to ventilate the fuel cell stack enclosure 16.

Air used to cool the high voltage battery 30 bypasses the tee connection 38 and enters the high voltage battery 30. The air next is moved through an exhaust fan 40 and then exhausted to an exterior 42 of the vehicle 12.

Air used to ventilate the fuel cell stack enclosure 16 exits a vent leg of the tee connection 38 and enters a filter 44, e.g., a pleated paper filter, to further remove particulate matter from the air. The air then is moved through a vent blower 46, e.g., a positive displacement air pump, and provided to the fuel cell stack enclosure 16 via the ventilation inlet port 26. The air exits the fuel cell stack enclosure 16 via the ventilation outlet port 28 and is exhausted to a main vehicle exhaust 48. In other examples, the air may be exhausted to a separate ventilation exhaust port or to the atmosphere.

Figure 3:
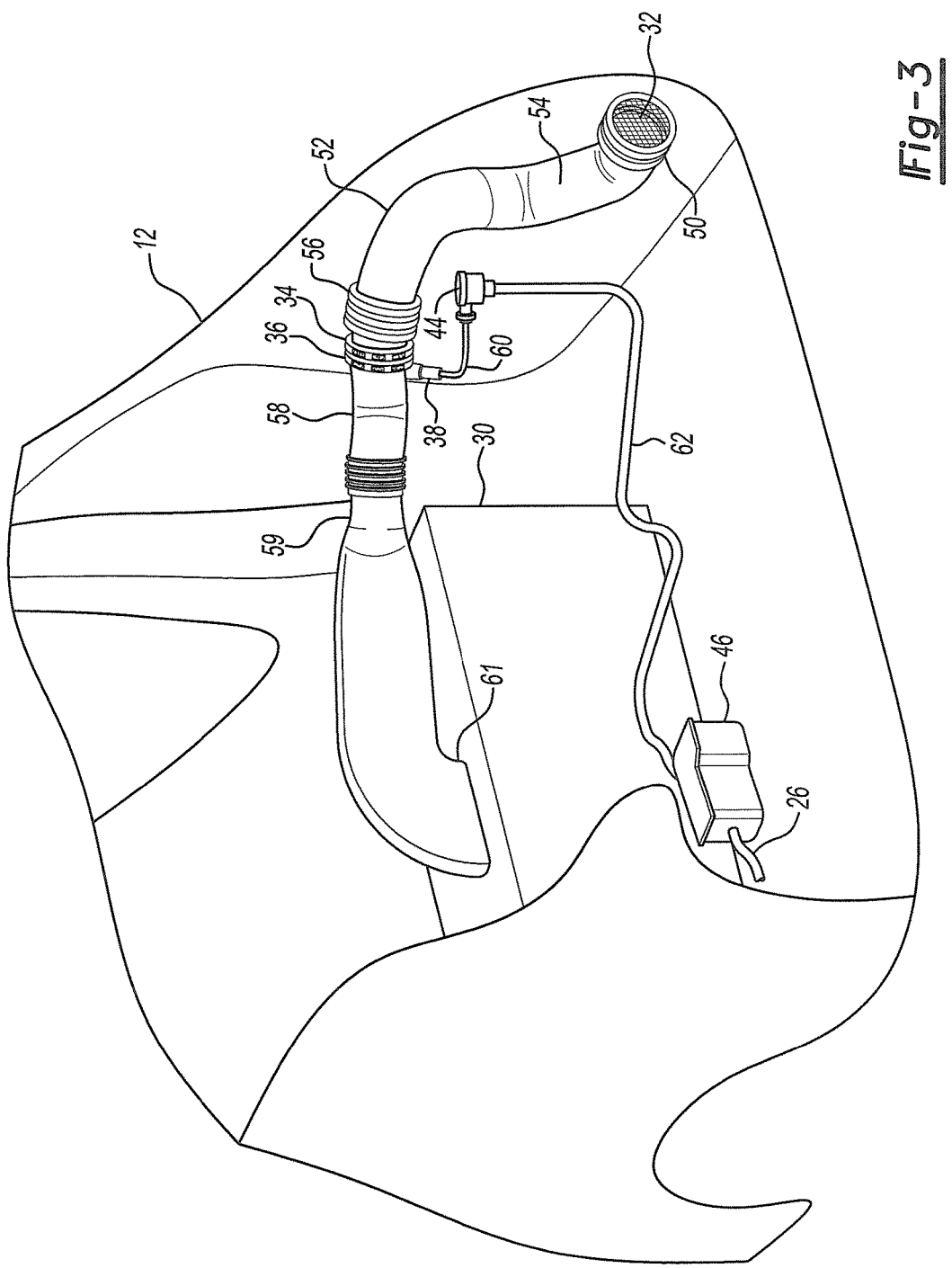
FIG. 3 is a perspective view of a portion of the ventilation system of FIG. 2.

As may be seen in the example of FIG. 3, an air inlet 50 is disposed at an end of an air channel 52. The air inlet 50 is positioned at a rear end of the vehicle 12 such that ambient air may enter the air inlet 50. In other examples, the air inlet 50 may be positioned elsewhere on the vehicle 12. As an example, the air inlet 50 may be positioned underneath the vehicle 12. As another example, the air inlet 50 may be positioned at a front end of the vehicle 12. As still yet another example, the air inlet 50 may be positioned within a cabin of the vehicle 12. Other configurations are also possible.

The rough particulate screen 32 is disposed within the air inlet 50. The air channel 52 includes a generally vertically oriented portion 54. This vertically oriented portion 54 reduces liquid ingress from the air inlet 50. An air outlet 56 is disposed at another end of the air channel 52. The fine particulate screen 34 and foam core filter 36 are positioned adjacent to the air outlet 56.

An end 58 of a battery cooling line 59 is attached with the foam core filter 36. Another end 61 of the battery cooling line 59 fluidly communicates air from the cooling line 59 to the high voltage battery 30.

The high voltage battery 30 is positioned behind a rear seat (not shown) of the vehicle 12. The air channel 52 and battery cooling line 59 are also positioned behind the rear seat of the vehicle 12. In other examples, the high voltage battery 30, air channel 52 and battery cooling line 59 may positioned elsewhere in the vehicle 12. As an example, the high voltage battery 30 may be positioned in front of a cabin (not shown) of the vehicle 12. The air channel 52 and battery cooling line 59 may also be positioned in front of the cabin of the vehicle 12. As another example, the high voltage battery 30 may be positioned underneath the cabin of the vehicle 12. The air channel 52 and battery cooling line 59 may also be positioned underneath the cabin of the vehicle 12. Other configurations are also possible.

The tee connection 38 is attached to the battery cooling line 59 downstream of the air inlet 50 and air outlet 56. The vent blower 46 pulls air from the cooling line 59, through the tee connection 38 and filter 44 via first and second ventilation lines 60, 62. The vent blower 46 then pushes the air into the fuel cell stack enclosure 16 (FIG. 2) via the ventilation inlet port 26.

Figure 4:
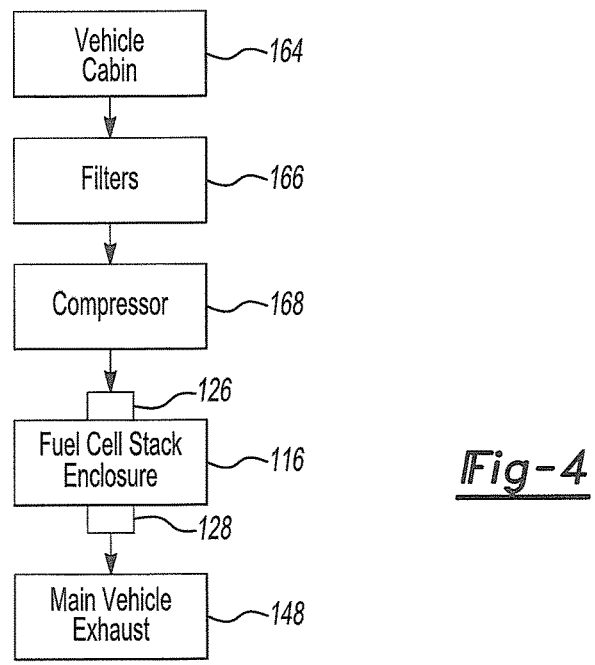
FIG. 4 is a block diagram of another exemplary ventilation system for the hydrogen fuel cell system of FIG. 1 according to certain embodiments of the invention.

As may be seen in the example of FIG. 4, ventilating air used to ventilate a fuel cell stack enclosure 116 is extracted from air in a vehicle cabin 164. In other examples, ventilating air may be extracted from air in a vehicle trunk (not shown) or other vehicle compartment. Other configurations are also possible. Numbered elements of FIG. 4 differing by 100 relative to numbered elements of FIGS. 1-3 have similar, although not necessarily identical, descriptions.

In the example of FIG. 4, the path of air is indicated by arrows. This path may be defined by one or more ducts, channels or other air passageways routed throughout the vehicle. As an example, if the fuel cell stack enclosure 116 is positioned in front of the vehicle cabin 164, the air may be routed from a rear of the vehicle cabin 164, underneath the vehicle cabin 164, to the fuel cell stack enclosure 116. Other configurations are also possible.

Air from the vehicle cabin 164 enters one or more filters 166 to filter out particulate matter. The air next is moved through a compressor 168 and provided to the fuel cell stack enclosure 116 via a ventilation inlet port 126. The air exits the fuel cell stack enclosure 116 via a ventilation outlet port 128 and is exhausted to a main vehicle exhaust 148.

Figure 5:
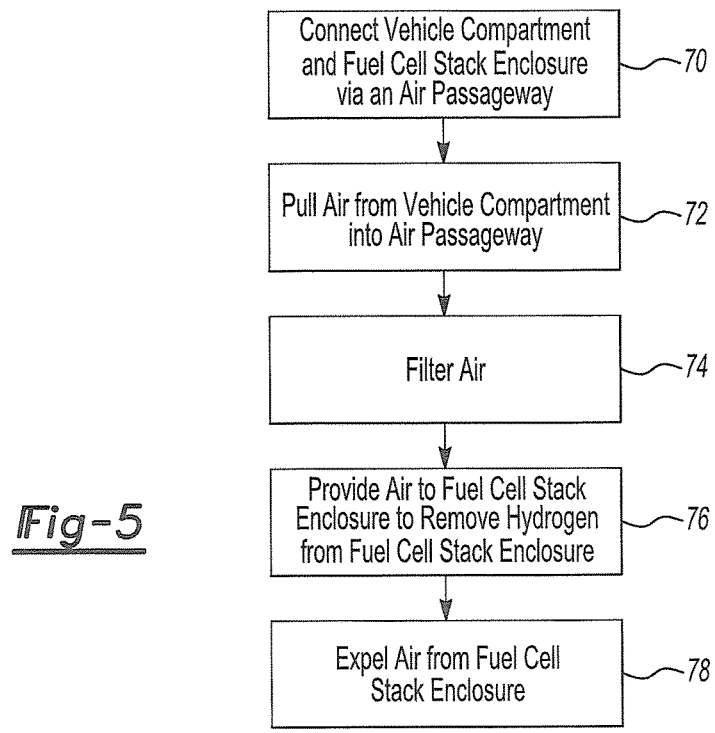
FIG. 5 is a flow chart of a strategy for ventilating a hydrogen fuel cell system according to certain embodiments of the invention.

An exemplary strategy for ventilating a fuel cell stack enclosure is shown in FIG. 5. At block 70, a vehicle compartment is connected with a fuel cell stack enclosure via an air passageway. At block 72, air from the vehicle compartment is pulled into the air passageway. At block 74, the air is filtered. At block 76, the air is provided to the fuel cell stack enclosure to remove hydrogen from the fuel cell stack enclosure. At block 78, the air is expelled from the fuel cell stack enclosure.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle comprising:
   a fuel cell enclosure;
   a battery arrangement;
   a duct fluidly connecting an air source and the battery arrangement and configured to deliver air from the air source to the battery arrangement to cool the battery arrangement; and
   a conduit arrangement projecting from and connecting the duct and fuel cell enclosure and configured to deliver air from the duct to the fuel cell enclosure to remove hydrogen from the fuel cell enclosure.

2. The vehicle of claim 1 wherein the duct includes an air filter.

3. The vehicle of claim 2 wherein the conduit arrangement has an entrance and wherein the entrance is downstream of the air filter.

4. The vehicle of claim 1 wherein the conduit arrangement includes an air filter.

5. The vehicle of claim 1 wherein the duct is configured to reduce liquid ingress from the air source.

6. The vehicle of claim 1 further comprising a pump to pull air from the duct into the conduit arrangement.

7. The vehicle of claim 6 wherein the pump comprises at least one of a positive displacement pump and a blower.

\* \* \* \* \*